Figure 1:
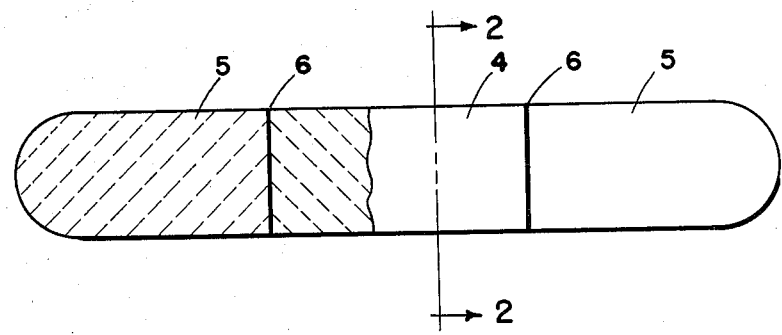

MOLYBDENUM DISILICIDE
SILICON CARBIDE

United States Patent Office 3,252,827
Patented May 24, 1966

3,252,827
REFRACTORY CARBIDE BODIES AND METHOD
OF MAKING THEM
Carl G. Rose and James C. Andersen, Niagara Falls, N.Y., assignors to The Carborundum Company, Niagara Falls, N.Y., a corporation of Delaware
Filed Nov. 5, 1958, Ser. No. 772,005
15 Claims. (Cl. 117—201)

This invention relates to refractory carbide bodies and to a method of making the same. In particular, the invention relates to high temperature silicon carbide electrical resistance heating elements, and to a method of making them.

Porous, self-bonded, recrystallized silicon carbide rods are widely used as electrical resistance heating elements. At operating temperatures of 1500° C. to 1700° C., these rods as presently available have a relatively short life expectancy. A primary cause of failure is oxidation, which occurs at the internal surfaces of the rods as well as at their external surfaces.

Many other refractory bodies, that operate at high temperatures, also have relatively short life expectancies because they are susceptible to oxidation. For example, rocket nozzles made of boron carbide would have a longer life expectancy if the boron carbide were more resistant to attack by oxygen.

One object of the present invention is to provide a refractory carbide body that is resistant to oxidation. A related object of the invention is to provide a practical method for protecting a porous refractory carbide body against oxidation.

Another object of the invention is to provide a silicon carbide electrical resistance heating element that has improved resistance to oxidation. A related object of the invention is to provide a practical process for the production of this heating element.

We have found that a porous, bonded refractory carbide body can be protected against oxidation by forming a layer of molybdenum silicide over all of the surfaces, both internal and external, that are exposed to the atmosphere or other oxygen source.

According to the preferred practice of our invention, we immerse a porous, self-bonded refractory carbide body in an aqueous suspension of finely divided molybdenum disilicide for a sufficient amount of time to permit the suspension to penetrate into the body, to wet the surface thereof thoroughly and substantially uniformly. Thereafter, the body is removed from the suspension and is dried, to deposit molybdenum disilicide in situ. The body is then fired in an inert atmosphere, to sinter or fuse the molybdenum disilicide, to permit it to wet the surfaces of the body thoroughly; and upon cooling of the body, the sintered or fused molybdenum disilicide bonds to the surfaces of the body and forms a coating thereon.

Molybdenum silicides have unique characteristics that make them particularly well adapted as oxidation resistant, film-forming material, for the protection of the surfaces of refractory bodies. Molybdenum silicide occurs in at least five recognized chemical combinations of molybdenum and silicon, each containing, respectively, different proportions of molybdenum and silicon. We prefer to use molybdenum disilicide, a form of molybdenum silicide containing approximately 36.9% by weight of silicon, since it is the most oxidation-resistant form. When molten, it wets the refractory carbides readily, particularly silicon carbide, so that upon cooling, a good bond is formed. It is compatible with the refractory carbides, and particularly with silicon carbide, at ordinary use temperatures; that is, there is no reaction between the molybdenum disilicide and the refractory carbides, and no erosion or corrosion. Moreover, as to silicon carbide in particular, molybdenum disilicide has approximately the same coefficient of expansion and degree of refractoriness, and is therefore a highly desirable, film-forming protective agent.

In use, we find that there appears to be a tendency for the layer or film, that is formed by cooling the sintered or fused molybdenum disilicide, to stratify, so that the outermost stratum may be silicon dioxide (cristobalite), and the lowermost stratum, that is bonded to the refractory body, appears to be molybdenum disilicide, and in between these two strata, there appear to be layers that represent different combinations of molybdenum, oxygen, and silicon, respectively.

Figure 2:
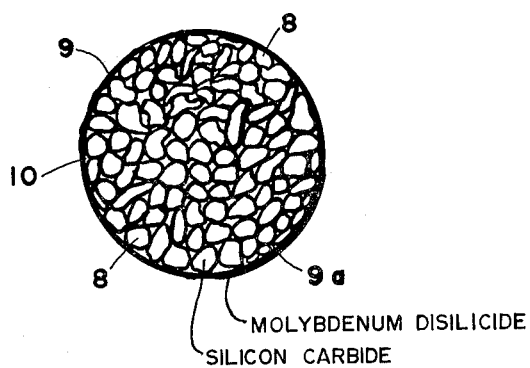

A better understanding of the invention may be had by referring to the appended drawing which is illustrative of the invention as embodied in a silicon carbide resistance type heating element, and in which:

FIGURE 1 is a longitudinal elevation, partially in section, of a silicon carbide heating element made according to and embodying the principles of the present invention; and FIGURE 2 is a highly enlarged, schematic section through a rod as viewed along line 2—2 of FIGURE 1.

The following specific examples illustrate more clearly the exact manner in which the process of the present invention can be carried out, although the invention is not to be construed as being limited to the particular proportions set forth in the examples. The percentages given, unless otherwise specified, are percentages by weight.

*Example 1*

Several electrical resistance heating elements were obtained having heating portions made of porous, recrystallized silicon carbide, having a porosity on the order of about 35% by volume, and having attached at each end thereof "cold ends" of siliconized silicon carbide.

The "cold ends" herein referred to are the ends of the rod that engage the holding means by which the resistors are supported and the means by which the electrical energy is supplied to the rod. They are called "cold ends" because they have been made to have a lower specific electrical resistance than that of the rod proper in order that they might not get as hot as the main body of the resistor. A lower temperature at the ends of the rod has been found to be highly desirable because otherwise the contact between the rod and the supporting member, and the supporting member itself for that matter, would soon be destroyed by the high temperature attained in the main body of the rod.

Siliconized silicon carbide bodies of the type used for "cold ends" of silicon carbide heating rods can be made by methods described and well known in the art by subjecting rods of recrystallized silicon carbide, as referred to above, or of porous carbon, such as charcoal, bonded by a carbonizable material, such as casein, to a siliconizing treatment at the temperature at which molten silicon rapidly penetrates such bodies. Such rods will be referred to hereafter as being of siliconized silicon carbide, such reference being proper because silicon carbide is formed in the porous carbon body by the silicon treatment and, naturally, there is silicon carbids in the body made by siliconizing the recrystallized silicon carbide body referred to above.

The aforementioned resistance heating elements were in the form of rods 17" overall length and ½" in diameter with a heating portion 6" long centrally positioned between two 5½" long terminal portions or "cold ends". (For example, see FIGURES 1 and 2 of the drawing for shape or configuration of element.) These rods were divided into two groups, hereafter referred to as Group A and Group B, respectively, to permit one group to be employed as a control group.

Four of these rods were selected from Group A, to receive a protective treatment according to our invention. The four rods selected are numbered 1 through 4, respectively, for identification. To impregnate these rods, a suspension was made up from the following ingredients:

325 gms. of molybdenum disilicide, having an average particle size of 0.7 micron
325 cc. of water
21 cc. of a solution containing 3½% by weight of polyvinyl alcohol
2 cc. of disodium dibutyl-ortho-phenylphenoldisulfonate, a wetting agent These materials were stirred thoroughly to obtain a substantially uniform mixture having a specific gravity of about 1.7. The four rods were then placed in an elongated, closed end cylindrical chamber having a horizontal axis. The chamber was evacuated, and then the suspension was admitted to the chamber to immerse the rods therein. The suspension was agitated for a period of about 5 minutes to maintain its composition substantially uniform, while the rods were immersed. At the end of this period, air was admitted to the chamber, and the wet rods removed.

The wet rods were then oven-dried at 100° C. for 2 hours. The immersion was then repeated in the same way, and the rods again dried. The heating section of Rod No. 3 was subjected to a chemical analysis that indicated the following partial content, in percentages by weight: molybdenum, 7.00; silicon carbide, 83.70; and oxides, 0.95. The molybdenum was assumed to be present principally combined with silicon as the silicide.

The three remaining dried rods were then placed in a tube furnace having an argon inlet at one end. The furnace was purged with argon for about 15 minutes, and then heated gradually to about 1500° C. and held at this temperature for approximately ½ hour. Argon was swept through the furnace throughout the firing period. The rods are then cooled in the furnace, in an argon atmosphere.

Upon removal from the furnace, it was observed that some silicon had spewed from the cold ends; and that the cold ends of the rods away from the argon inlet were covered with a grayish-white material that may be a form of silica or silicon nitride.

The data in Table I indicates the amount of disilicide with which these rods were impregnated.

TABLE I

| Rod No. | Weight in Grams of Rod As Received | Weight in Grams of Rod After First Impregnation and Drying | Percent Gain in Weight | Weight in Grams of Rod After Second Impregnation and Drying | Total Percent Gain in Weight |
| --- | --- | --- | --- | --- | --- |
| 1 | 122.3 | 128.3 | 4.90 | 128.8 | 5.31 |
| 2 | 117.3 | 124.7 | 6.31 | 124.9 | 6.48 |
| 3 | 107.4 | 117.8 | 9.68 | 117.1 | 9.02 |
| 4 | 115.7 | 122.3 | 5.71 | 123.9 | 7.09 |

The electrical calibration of the remaining three rods before and after impregnation and firing were as follows:

TABLE II

| Rod No. | Rod Calibration Prior to Impregnation | | | Calibration After Impregnation and Firing | | |
| --- | --- | --- | --- | --- | --- | --- |
| | Volts | Amperes | Ohms | Volts | Amperes | Ohms |
| 1 | 35 | 25 | 1.4 | 33 | 46 | 0.72 |
| 2 | 35 | 25 | 1.4 | 33 | 46 | 0.72 |
| 4 | 35 | 25 | 1.4 | 34 | 43 | 0.79 |

These three rods were subjected to comparative electrical tests with the rods that were set aside originally to provide control Group B. It was noted that the heating elements that were protected by the deposit of molybdenum disilicide increase in electrical resistance over the period of the test at twice as fast a rate as the control heating elements. However, their life expectancy based upon their average length of life at operating temperatures before failure, is more than three times as long at 2700° F. (1480° C.) at a loading of 100 watts per square inch. This is an extremely significant increase in life expectancy.

Referring further to the two figures of the drawing, the heating rod comprises a central heating portion 4 of molybdenum silicide-coated, recrystallized silicon carbide to which two terminal portions or "cold ends" 5 of siliconized silicon carbide are bonded by means of weld joints 6. Inspection of the protected rods in Group A indicates that the sintered or fused molybdenum disilicide forms a substantially continuous layer over the silicon carbide. The silicon carbide retains its characteristic skeletal structure, and the layer formed by sintering or fusing and then cooling the molybdenum disilicide is disposed in situ over the internal, as well as the external, surfaces of the silicon carbide 8.

The molybdenum disilicide layer 9 is interstitial in character; and in a few of the pores 10 of the silicon carbide body, a small accumulation of the molybdenum disilicide may be found. In general, however, the layer has substantially uniform thickness and is continuous, to provide an internal protective coating 9a over all of the interanl or interstitial surfaces on which it is disposed as well as the external coating 9 of the rod.

The protected heating elements and the control elements were tested at 1480° C. surface temperature and 100 watts p.s.i. Each of the three protected elements exhibited a life on the order of 2100 hours, before failure. To obtain the same amount of operating life, a total of 11 control elements had to be used. This indicates that under similar conditions, a protected element has a life expectancy of at least about 2000 hours, as compared to the life expectancy of an unprotected element of between about 550 and 600 hours, at this surface temperature and loading.

*Example 2*

Further to demonstrate the invention, a slurry of molybdenum disilicide was prepared from the following materials:

250 gms. molybdenum disilicide, average particle size about 0.9 micron
250 cc. of water
2 cc. of a wetting agent, disodium dibutylortho-phenylphenoldisulfonate Three recrystallized silicon carbide heating portions, for electrical resistance heating elements, were obtained. These heating portions had a porosity of about 35% by volume. The slurry was placed in a flask, and the heating portions immersed in the slurry. The flask was evacuated and the rods permitted to remain immersed in the slurry for approximately 5 minutes. The rods were then removed. At this point, the rods were assigned numbers, 11 through 13, respectively, for identification. The following weight changes were observed as a result of the immersion and drying:

TABLE III

| Rod No. | Initial Weight | Weight after Impregnation and Drying | Percent Gain in Weight |
| --- | --- | --- | --- |
| 11 | 34.47 | 38.14 | 10.6 |
| 12 | 34.95 | 38.86 | 11.2 |
| 13 | 32.33 | 35.96 | 11.2 |

Rods 11 and 13 were heated to 180° C., and then reimmersed in the slurry while hot, for a period of 45 seconds, and then dried. This additional step deposited a coating on the surface of each of the two rods. To build up the thickness of the surface coating, this step was repeated once again, with these two rods. The following weight changes were observed:

TABLE IV

| Rod No. | Weight after Reimmersion and Drying | Total Percent Gain in Weight | Weight after Second Reimmersion and Drying | Total Percent Gain in Weight |
| --- | --- | --- | --- | --- |
| 11 | 40.50 | 17.6 | 42.75 | 24.0 |
| 13 | 38.05 | 17.8 | 40.50 | 25.3 |

Rods 11, 12, and 13 were fired in a tube furnace to a temperature of 1500° C. in a helium atmosphere, and thereafter, cooled. Their resistivities, respectively, were measured and found to be as follows:

TABLE V

| Rod No. | Ohms | Length (inches) | Diameter (inches) | Ohm-cm. |
| --- | --- | --- | --- | --- |
| 11 | 0.48 | 4.972 | 0.517 | 0.051 |
| 12 | 0.54 | 4.990 | 0.523 | 0.059 |
| 13 | 0.52 | 4.978 | 0.509 | 0.055 |

Cold ends were then attached to these heating portions in the following manner. A paste was prepared from the following ingredients:

Silicon carbide, 1000 mesh (particle size, 2 microns to about 20 microns, average about 7 microns) 100 gms.
Liquid resorcinol-formaldehyde resin 37.5 cc.
Pine oil 17.5 cc.
Paraformaldehyde 2.0 gms.

The silicon carbide and paraformaldehyde were tumbled together and then passed through a fine screen. The pine oil and the resin were then blended into this mixture, to form a paste. Two siliconized silicon carbide cold ends, 6 inches long, were then cemented on the ends of each of the heating portions 11, 12 and 13 respectively, with this paste. These assemblies were then placed in a drier at 150° C. and held there for about 2 hours. At the end of this period, these assemblies were removed from the drier, and excess paste removed from the joints.

The assembly was then placed in the vertical bore of a bored out graphite block with the assembly properly positioned so that the joint between the heating portion and one of the cold end portions was centered in the bore. The graphite block containing the assembly was held between two massive graphite terminal blocks by the pressure of the terminal blocks so that the bored graphite block constituted the resistance element of the apparatus. Finely divided elemental silicon was placed within the bore of the graphite block so as to surround the joint of the assembly, the bore being of enlarged cross-section in its upper portion to form a crucible-like cavity around the rod at the joint. The electrical current was turned on and the temperature of the block raised extremely rapidly, within a period of four minutes, to 2000° C., whereupon the molten silicon penetrates the joint and reacts with the carbonized portion of the joint paste to form additional silicon carbide and bond the cold end to the heating portion. The assembly is then permitted to cool. When below red heat, the assembly was removed from the block, and the same procedure repeated for the second joint.

This technique produces welded joints of excellent strength and satisfactory electrical resistivity. The same welding technique can be used to form welded joints between the heating portion and the cold ends except that molybdenum silicide is used as the bonding medium. As an example, the cold ends have been attached to the heating portion with a paste of the following composition, the procedure being the same as that employed above using siilcon as the impregnant except that no impregnating powder need be used.

Paste composition:                                     Parts by weight
  Silicon carbide (1000 mesh) _____ 37.5
  Molybdenum disilicide _____ 62.5
  Pine oil _____ 17.5
  Resorcinol _____ 17.5
  Paraformaldehyde _____ 1

Rod No. 12 was then subjected to actual conditions of use, at high temperature, to determine its life. Initially, a voltage of 19.1 volts was applied to the cold ends of this element, and a current of 34.0 amperes flowed through the element, indicating a power input of 649 watts, and a total resistance for the element of 0.56 ohm. Within a period of about 20 minutes, the surface temperature of the rod rose to about 1700° C., as observed with an optical pyrometer. At this point, the indicated applied voltage was 27.2 volts, and the current 51.0 amperes, indicating a power input of 1387 watts and an element resistance of 0.53 ohm. This rod suffered mechanical failure only after more than 136 hours of continuous use at 1700° C. or slightly higher. During this period, the resistance of the element increased slowly until, after about 24 hours, a resistance value of about 0.80 ohm was attained, which remained fairly constant thereafter throughout the remaining life of the element. The power input dropped to about 675 watts at the end of the first 24 hours, and remained fairly constant, in the neighborhood of 675 watts to about 700 watts, during the remainder of the test.

Rod No. 11 was tested in a similar manner, with an applied voltage having an initial value of 18.0 volts, and a voltage range during the test of 18.0 up to about 20.0 volts. The current had an average value in the neighborhood of about 35 or 36 amperes once operating heat was obtained. The operating temperature during the test was approximately 1700° C. The indicated resistance of the element initially was 0.48 ohm, which dropped to about 0.35 ohm as the rod heated up, then rose to approximately its original value during the first 24 hours of the test, then thereafter, rose more slowly to about 0.54 ohm at the end of the test. The rod functioned satisfactorily as a resistance type heating element at an operating temperature of 1700° C. for over 209 hours of operation. An X-ray examination of the crystal formation in a cross section of the rod, after failure, indicated the presence of beta silicon carbide and molybdenum disilicide.

In general, the temperature-resistivity characteristic of a molybdenum silicide-protected heating element is similar in shape to that of an unprotected element, with, however, a lower resistivity. The following comparative data demonstrates the resistivity of a protected element, and an unprotected element, at several different temperatures, that were observed as the respective heating elements were raised in temperature and held at the several respective temperature points until stable operation was attained.

TABLE VI

| Temperature, °F. | Resistivity, Ohm-Cms. | |
| --- | --- | --- |
| | Protected Element | Unprotected Element |
| 70 | 0.100 | 0.200 |
| 500 | 0.055 | 0.120 |
| 1,000 | 0.043 | 0.078 |
| 1,500 | 0.038 | 0.083 |
| 2,000 | 0.040 | 0.100 |
| 2,500 | 0.046 | 0.126 |

During actual operation of the elements at operating temperatures, the resistivity increases gradually. For example, in a test of 1480° C. surface temperature, with a loading of 90 watts per square inch, a protected element demonstrated an average increase in resistance of 67% after 407 hours, whereas an unprotected element showed an increase in resistance of about 47%. The change in resistivity depends on the size of the heating element and its operating temperature. For example, a thin-walled tubular ½" diameter heating element without cold ends, operated for 280 hours at 1600° C., exhibited an increase in resistance of 9%.

We have found that our impregnation technique, as described above, is equally applicable to the protection of other refractory carbide bodies, such as, for example, for the protection of boron carbide rocket nozzles. When a preformed rocket nozzle is protected with a layer of molybdenum disilicide according to our method, it exhibits increased resistance to oxidation and is characterized by longer life expectancy. Bodies composed of other transition metal carbides, such as refractory carbides of the metals of groups IV–A, V–A and VI–A of Mendeléeff's periodic table, including zirconium, hafnium, titanium, vanadium, tantalum, molybdenum, chromium, tungsten, thorium, and niobium, can be protected by internal and external coatings of molybdenum silicide, applied in the manner set forth herein.

We may also treat silicon carbide heating elements with molybdenum disilicide by placing the heating element, together with approximately the required amount of molybdenum disilicide, in a furnace, and heating the element and the molybdenum disilicide to a temperature of about 2100° C. in an inert atmosphere, in contact with each other. This technique is referred to in the art as "shooting," and at the proper elevated temperature, the molybdenum disilicide impregnates the recrystallized silicon carbide element extremely rapidly. This technique is effective for applying molybdenum disilicide to the silicon carbide body, but is not readily subject to control, and frequently results in a non-uniform deposition of the molybdenum disilicide. For this reason, "shooting" is not very effective for the production of protected heating elements, because non-uniform results are obtained such as, for example, treated heating elements that have widely different resistances, widely different life expectancies, and hence, unpredictable performance. When the pores of the heating element are completely filled with molybdenum disilicide, for example, the molybdenum disilicide carries all of the current This changes the characteristics of the heating element quite drastically. To protect heating elements of recrystallized silicon carbide, it is essential that the protective layer of molybdenum disilicide be substantially uniform in thickness, continuous, and evenly deposited over substantially all of the surface area of the element to which the atmosphere has access. The layer of molybdenum disilicide should cover not only the crystals, but also the inter-crystalline bonds. However, for many purposes where uniformity is not necessary, but some degree of protection is important, "shooting" may be employed.

When protecting heating elements by our process, we have found that in general, recrystallized silicon carbide heating elements have a porosity of about 25% to 35% by volume. We obtain best results when we add about 20% by weight of molybdenum disilicide to the heating element, based on the original weight of the heating element. However, effective protection is obtained by impregnation with molybdenum disilicide in the amount of about 10% to 25% by weight of molybdenum disilicide. In practice, with the heating elements that we have treated it has been difficult to effect an impregnation that deposits an amount of molybdenum disilicide in excess of 25% by weight of the heating element, because some of the pores of the heating elements are closed pores, to which the impregnating slurry, as well as the atmosphere, cannot obtain access.

To protect less porous, more dense bodies of silicon carbide against oxidation, less molybdenum silicide is necessary since the surface area that must be covered is correspondingly smaller.

We frequently prefer to deposit the molybdenum disilicide in situ by prolonged immersion in a molybdenum disilicide suspension, and thereafter, build up a coating on the outside surface of the heating element by the technique described in the Example 2, i.e., by heating the element and then plunging it or rolling it in the suspension to form what is primarily an external deposit on the surface of the element. This can be repeated as many times as desired, to build up the external coat to substantially any desired thickness. Since the external coat tends to prevent atmospheric penetration to the interior of the heating element, external coatings are effective in resisting oxidation. However, we have found that external coatings alone are ineffective, at the present time, because of the difficulty of forming an impervious coat through which the atmosphere cannot penetrate, and also because air is trapped within the coating and tends to rupture the coating at the operating temperature of the heating element.

We are aware that in a certain limited, relatively low temperature range, molybdenum disilicide itself exhibits susceptibility to oxidation. This susceptibility can be inhibited to a considerable extent by incorporating finely divided metal powders in the molybdenum disilicide slurry. For example, finely divided nickel and chromium retard the oxidation rate, apparently by preferential oxidation. Up to about 50% by weight of powdered metal, based on the weight of the molybdenum disilicide, can be used.

Refractory carbide bodies that have been produced according to our technique are patricularly suited for many of the uses for which industrial refractories are required and where oxidation resistance is a particularly important property, such as, for example, jet engine combustion chambers, linings for exhaust nozzles, rocket combustion chambers and exhaust nozzles, turbine blades, stator blades, lens fusion blocks, combustion boats, crucibles, burner holders, and the like.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set foth, and as fall within the scope of the invention or the limits of the appended claims.

We claim:

1. An electrical resistance heating element comprising a body consisting essentially of silicon carbide impregnated with molybdenum silicide.

2. An electrical resistance heating element comprising a body composed essentially of recrystallized silicon carbide impregnated with molybdenum disilicide.

3. An electrical resistance heating element comprising a body composed essentially of silicon carbide impregnated with molybdenum silicide, the impregnant extending into the porous surface areas of the body and also extending over the surface thereof to provide a coating bonded to said body.

4. An electrical resistance heating element comprising a body composed essentially of silicon carbide and having an outer surface over which there is provided a protective coating of molybdenum silicide, said coating being sintered in situ and bonded to said surface and extending into the porous surface areas of said body.

5. An electrical resistance heating element comprising a body consisting essentially of silicon carbide and a layer of molybdenum disilicide sintered onto said body and extending over a surface thereof.

6. An electrical resistance heating element comprising a body consisting essentially of silicon carbide and having an outer skeletal-like surface portion and a coating formed of molybdenum silicide sintered with and extending over said surface and into the skeletal-like surface portion to provide a protective coating for said body.

7. An electrical resistance heating element comprising a body consisting essentially of a refractory carbide having a skeletal structure, said body portion being impregnated with molybdenum disilicide and having a protective layer of molybdenum disilicide extending over the surface of said body.

8. As a new article of manufacture, a refractory carbide body having an outer surface and a protective coating of molybdenum silicide extending over said surface and being bonded thereto.

9. As a new article of manufacture, a body composed essentially of a refractory carbide body and having an outer skeletal-like surface portion impregnated and coated with molybdenum silicide bonded to said surface.

10. As a new article of manufacture, a body consisting essentially of silicon carbide, a surface portion of which is impregnated with molybdenum silicide to form a protective coating over the exposed surfaces of said body.

11. An electrical resistance heating element comprising a body consisting essentially of siliconized silicon carbide and having a skeletal-like surface portion coated and impregnated with molybdenum silicide sintered and bonded to said surface.

12. As an article of manufacture, a refractory carbide body having a skeletal structure comprising particles of refractory carbide that are bonded together and having an external surface having pores therein and a coating of molybdenum silicide superposed upon and sintered to the surface and pore areas in protective relation thereto.

13. Heating conductor composed of a conductor consisting essentially of silicon carbide with a coating of molybdenum silicide sintered on the conductor and resistant to oxidizing.

14. A method of rendering oxidation resistant a porous refractory carbide body comprising depositing on the surface and in the pores adjacent the surface finely divided molybdenum silicide and firing said body to sinter the molybdenum silicide and bond it to said body.

15. The method of making a heating conductor which comprises the steps of applying pulverulent molybdenum silicide in the form of a coating to the surface of a body consisting essentially of silicon carbide, and then sintering said coating on said body by heating to incandescence at a temperature of about 1500° C.

References Cited by the Examiner

UNITED STATES PATENTS

| | | | |
|---|---|---|---|
| 1,906,963 | 5/1933 | Heyroth | 338—330 |
| 1,978,323 | 10/1934 | Power | 338—330 |
| 2,406,275 | 8/1946 | Wejnarth | 106—46 |
| 2,431,326 | 11/1947 | Heyroth | 106—44 |
| 2,735,881 | 2/1956 | Mann | 338—330 |
| 2,814,857 | 12/1957 | Duckworth | 106—44 XR |

FOREIGN PATENTS

| | | |
|---|---|---|
| 739,780 | 11/1955 | Great Britain. |
| 780,735 | 8/1957 | Great Britain. |

OTHER REFERENCES

Schwartzkopf: "Refractory Hard Metals," pub. 1953 by MacMillan Co., N.Y.C., pp. 336–339.

Lynch et al.: "Molybdenum Disilicide Coating for Graphite," PB 121084, Battelle Memorial Institute for Wright Air Development Center, September 1954, OTS U.S. Dept. of Commerce, 33 pp., p. 5 relied on.

RICHARD D. NEVIUS, *Primary Examiner*.

JOSEPH R. SPECK, MARCUS U. LYONS, RAY K. WINDHAM, *Examiners*.